(12) United States Patent
Fahrny et al.

(10) Patent No.: US 7,383,438 B2
(45) Date of Patent: Jun. 3, 2008

(54) SYSTEM AND METHOD FOR SECURE CONDITIONAL ACCESS DOWNLOAD AND RECONFIGURATION

(75) Inventors: James William Fahrny, Pueblo, CO (US); Mark William Wilson, Ellicott City, MD (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 774 days.

(21) Appl. No.: 11/017,559

(22) Filed: Dec. 18, 2004

(65) Prior Publication Data

US 2006/0137015 A1 Jun. 22, 2006

(51) Int. Cl.
*H04L 9/00* (2006.01)
*H04N 7/167* (2006.01)
*H04K 1/00* (2006.01)

(52) U.S. Cl. ......................................... 713/169; 725/31
(58) Field of Classification Search ................ 713/169; 725/31
See application file for complete search history.

(56) References Cited

U.S. PATENT DOCUMENTS

| | | | |
|---|---|---|---|
| 4,792,973 | A | 12/1988 | Gilhousen et al. |
| 4,860,353 | A | 8/1989 | Brown |
| 5,054,067 | A | 10/1991 | Moroney et al. |
| 5,671,276 | A | 9/1997 | Eyer et al. |
| 5,734,720 | A | 3/1998 | Salganicoff |
| 5,784,095 | A | 7/1998 | Robbins et al. |
| 5,982,363 | A | 11/1999 | Naiff |
| 6,157,719 | A | 12/2000 | Wasilewski et al. |
| 6,271,837 | B1 | 8/2001 | Naiff |
| 6,424,717 | B1 | 7/2002 | Pinder et al. |
| 6,748,080 | B2 | 6/2004 | Russ et al. |
| 6,898,285 | B1 | 5/2005 | Hutchings et al. |
| 6,976,163 | B1 | 12/2005 | Hind et al. |
| 7,069,452 | B1 | 6/2006 | Hind et al. |
| 2001/0046299 | A1 | 11/2001 | Wasilewski et al. |
| 2002/0090090 | A1 | 7/2002 | Van Rijnsoever et al. |
| 2002/0101990 | A1 | 8/2002 | Morino et al. |
| 2002/0118837 | A1 | 8/2002 | Hamilton |

(Continued)

FOREIGN PATENT DOCUMENTS

WO 03043310 5/2003

OTHER PUBLICATIONS

ANSI/SCTE 41 2003 (Formerly DVS 301 POD Copy Protection Standard.

(Continued)

*Primary Examiner*—Matthew Heneghan
(74) *Attorney, Agent, or Firm*—Brooks Kushman P.C.

(57) ABSTRACT

A method of securely downloading at least one of conditional access software (CAS), Digital Rights Management software (DRMS), Trusted Domain Software (TDS), and Gaming Security Software (GSS) includes presenting a specialized entitlement management message (EMM) to initiate the download to a receiver security device using a supervisory logon key (SLK) split to logon with a second split contained inside the receiver security device, presenting a receiver digitally signed random challenge from the receiver security device to a sender security server to establish authentication of the receiver security device to the sender security server, and signing and returning the receiver random challenge from the sender security server to the receiver security device with a sender random challenge to establish authentication of the sender security server to the receiver security device.

23 Claims, 6 Drawing Sheets

U.S. PATENT DOCUMENTS

| | | |
|---|---|---|
| 2002/0136406 A1 | 9/2002 | Fitzhardinge et al. |
| 2002/0170054 A1 | 11/2002 | Kudelski et al. |
| 2003/0002577 A1 | 1/2003 | Pinder |
| 2003/0097655 A1 | 5/2003 | Novak |
| 2003/0123667 A1 | 7/2003 | Weber et al. |
| 2003/0190044 A1 | 10/2003 | Higashi et al. |
| 2003/0219127 A1 | 11/2003 | Russ et al. |
| 2004/0057579 A1 | 3/2004 | Fahrny |
| 2004/0098591 A1 | 5/2004 | Fahrny |
| 2004/0177369 A1 | 9/2004 | Akins, III |
| 2004/0208316 A1 | 10/2004 | Wack et al. |
| 2005/0010778 A1 | 1/2005 | Walmsley |
| 2005/0100161 A1 | 5/2005 | Husemann et al. |
| 2005/0119967 A1 | 6/2005 | Ishiguro et al. |
| 2005/0169468 A1* | 8/2005 | Fahrny et al. .............. 380/210 |
| 2006/0031873 A1 | 2/2006 | Fahrny et al. |
| 2006/0122846 A1 | 6/2006 | Fahrny et al. |
| 2006/0153379 A1 | 7/2006 | Candelore et al. |
| 2006/0184796 A1 | 8/2006 | Fahrny |
| 2006/0200412 A1 | 9/2006 | Fahrny et al. |
| 2007/0253551 A1* | 11/2007 | Guillot et al. .............. 380/200 |

OTHER PUBLICATIONS

FIPS PUB 140-2 "Security Requirements for Cryptographic Modules", May 25, 2001, http://www.itl.nist.gov/fibspubs/.

FIPS PUB 186-2, "Digital Signature Standard" Federal Information Processing Standards Publication (FIPS PUB), Jan. 27, 2000, http://www.itl.nist.gov/fibspubs/.

FIPS-PUB 180-2, "Secure Hash Standard" Federal Information Processing Standards Publication (FIPS PUB), Aug. 1, 2002, http://www.itl.nist.gov/fibspubs/.

FIPS-PUB 46-3 "Data Encryption Standard", Oct. 25, 1999 http://csrc.nist.gov/publications/fips/fips46-3/flips46-3.pdf.

FIPS-PUB 81 "DES Modes of Operation", Dec. 2, 1980; http://www.itl.nist.gov/fibspubs/fip81.htm.

IETF RFC 1750, Randomness Recommendations for Security, (Donald Eastlake, Stephen Crocker and Jeff Schiller), Dec. 1994, www.ietf.org/.

IETF RFC 2104, HMAC: Keyed-Hashing for Message Authentication, (Krawczyk, Bellare, and Canetti), Mar. 1996, www.ietf.org/.

IETF RFC 2630, Cryptographic Message Syntax, (R. Housley), Jun. 1999, www.ietf.org/.

IETF RFC 3280, "Internet X.509 Public Key Infrastructure Certificate and CRL Profile", R. Housley, W. Ford, W. Polk, D. Solo, Jan. 2002, www.ietf.org/.

RSA1, "PKCS #1: RSA Encryption Standard", Version 1.5, RSA Laboratories, Nov. 1993 2.2 Reference Acquisition, http://www.rsasecurity.com/rsalabs/pkcs/.

CableLabs Specifications, www.opencable.com, p. 1.

Hopper, Andy, A Network Striped Storage System for Video on Demand, article, http://citeseer.ist.psu.edu/26010.html.

"Explorer 4200HD Home Gateway" Copyright 2002 Scientific Atlanta Inc., http://www.sciatl.com/products/consumers/userguidepdfs/4001344.pdf.

Jim Lyle, "HDCP: what it is and how to use it" Originally Published Apr. 18, 2002 pp. 1-5, and Figures 1-6. http://www.edn.com/index.asp?layout=articlePrint&articleID=CA209091.

FCC News: Commission Adopts "Navigation Devices" Rules Creating Consumer Market for Set Top Boxes and Other Equipment Used with Video Programming Systems (CS Docket 97-80). Originally Published Jun. 11, 1998 pp. 1-3 http://www.fcc.gov/Bureaus/Cable/News_Releases/1998/nrcb8013.html.

* cited by examiner

SYSTEM AND METHOD FOR SECURE CONDITIONAL ACCESS DOWNLOAD AND RECONFIGURATION

BACKGROUND OF THE INVENTION

1. Field of the Invention

The present invention relates to a system and a method for secure conditional access download and reconfiguration.

2. Background Art

Conventional implementations of media (e.g., video, audio, video plus audio, interactive games, and the like) program stream delivery systems (e.g., cable, satellite, etc.) include a headend where the media programming originates (i.e., is encoded and compressed, groomed, statmuxed, and otherwise appropriately processed), a network (e.g., cable or satellite) for delivery of the media programming to the client (i.e., customer, user, buyer, etc.) location, at least one set top box (STB), personal computer (PC), gaming device, and the like at the client location for conversion and access (e.g., decryption and decompression) of the media programming or content stream, and at least one respective access or viewing device such as a television (TV), gaming device, PC, or monitor that is connected to the multiple system operator (MSO) network. Alternatively, the STB may be eliminated, and decryption and decompression may be implemented in the receiving device.

Conventional headends and STBs employ particular matching encryption/decryption and compression/decompression technologies. However, there is little standardization of particular matching encryption/decryption across media program stream delivery system vendors. The encryption/decryption and compression/decompression technologies in the particular conventional system are fixed and often proprietary to the vendor. Furthermore, conventional media service processing and delivery systems typically implement security processes in connection with individual implementations of point of deployment, CableCard, Smartcard, etc. systems. When a conventional approach is subjected to an attack (e.g., an attempt to hack services) the switching costs and renewability costs to implement a counter measure (e.g., a response to the attack) can be significant.

Transitions to upgrades in encryption/decryption and compression/decompression technologies are, therefore, expensive and difficult for the media program stream delivery system vendors to implement. As such, customers can be left with substandard service due to the lack of standardization and the reduced competition that the lack of standardization has on innovation in media service delivery. The lack of standardization also restricts the ability of media service providers to compete. For example, customers may have viewing devices or interactive game devices that could take advantage of the improved technologies; however, media stream delivery system upgrades may be impossible, impracticable, or not economically feasible for vendors using conventional approaches. A significant level of customer dissatisfaction or vendor cost may result and the ability of media service providers to improve service and/or add new services is greatly restricted.

Thus, it would be desirable to have a system and a method for conditional access (CA), Rights management, Trusted Domain security, or interactive gaming access download and reconfiguration that overcomes the deficiencies of conventional approaches.

SUMMARY OF THE INVENTION

The present invention generally provides new and innovative systems and techniques for securely renewing (e.g., using role based authentication) and reconfiguring a conditional access (CA) or security download and reconfiguration product to support both proprietary and non-proprietary implementations that overcomes deficiencies of conventional approaches as well as providing additional improvements. The present invention generally provides an improved system and method that may be compatible with previously used (i.e., legacy) systems and methods using all levels of media stream processing and delivery service (i.e., basic to high-end) as well as adaptable to future implementations, and that is flexible, renewable, re-configurable, and supports simultaneous multiple security systems and processes.

According to the present invention, a method of securely downloading at least one of conditional access software (CAS), Digital Rights Management software (DRMS), Trusted Domain Software (TDS), and Gaming Security Software (GSS) is provided. The method comprises presenting a specialized entitlement management message (EMM) to initiate the download to a receiver security device using a supervisory logon key (SLK) split to logon with a second split contained inside the receiver security device, presenting a receiver digitally signed random challenge from the receiver security device to a sender security server to establish authentication of the receiver security device to the sender security server, and signing and returning the receiver random challenge from the sender security server to the receiver security device with a sender random challenge to establish authentication of the sender security server to the receiver security device.

Also according to the present invention, a system for securely downloading at least one of conditional access software (CAS), Digital Rights Management software (DRMS), Trusted Domain Software (TDS), and Gaming Security Software (GSS) is provided. The system comprises a headend having a sender security server, and a receiver coupled to the headend, and having a receiver security device. The sender security server presents a specialized entitlement management message (EMM) to initiate the download to the receiver security device using a supervisory logon key (SLK) split to logon with a second split contained inside the receiver security device. The receiver security device presents a receiver digitally signed random challenge to the sender security server to establish authentication of the receiver security device to the sender security server. The sender security server signs and returns the receiver random challenge to the receiver security device with a sender random challenge to establish authentication of the sender security server to the receiver security device.

Further, according to the present invention, a receiver security device for securely downloading at least one of conditional access software (CAS), Digital Rights Management software (DRMS), Trusted Domain Software (TDS), and Gaming Security Software (GSS) is provided. The device comprises a microprocessor, a transport chip coupled to the microprocessor, and a memory coupled to the microprocessor. The memory includes programming to perform the steps of receiving a specialized entitlement management message (EMM) to initiate the download at the receiver security device using a supervisory logon key (SLK) split to logon with a second split contained inside the receiver security device from a sender security server via the transport chip, presenting a receiver digitally signed random challenge from the receiver security device to the sender security server to establish authentication of the receiver security device to the sender security server, and receiving the signed receiver random challenge and a sender random challenge from the sender security server to establish authentication of the sender security server to the receiver security device.

The above features, and other features and advantages of the present invention are readily apparent from the following detailed descriptions thereof when taken in connection with the accompanying drawings.

BRIEF DESCRIPTION OF THE DRAWINGS

FIGS. 2(a-b) are diagrams of media processing and delivery systems implementing the present invention;

DETAILED DESCRIPTION OF THE PREFERRED EMBODIMENT(S)

With reference to the Figures, the preferred embodiments of the present invention will now be described in detail. In one example, the present invention may be implemented in connection with a cable television broadcast and Video on Demand (VOD) transmission and reception system. In another example, the present invention may be implemented in connection with a digital broadcast satellite (i.e., "dish") television transmission and reception system (not shown). In yet other example, the present invention may be used to support Digital Rights Management, trusted domain security and security for interactive game devices. However, the present invention may be implemented in connection with any appropriate media stream transmission and reception system to meet the design criteria of a particular application.

In the description below, these terms may be defined as follows:

Access: The ability and structure (i.e., hardware, software, firmware, etc.) to communicate with or otherwise interact with a system in order to use system resources to either handle information or gain knowledge of the information the system contains. A specific type of interaction between a subject and an object that results in the flow of information from one to the other. Any ability to communicate with a system, including one-way communication in either direction. In actual practice, however, entities outside a security perimeter that can receive output from the system but cannot provide input or otherwise directly interact with the system, might be treated as not having "access" and, therefore, be exempt from security policy requirements, such as the need for a security clearance.

Access control: Protection of system resources against unauthorized access. A process by which use of system resources is regulated according to a security policy and is permitted by only authorized entities.

AES: Advanced Encryption Standard. AES is generally a much more secure algorithm to use for the storing of digital content in a digital video recording When compared to DES.

ASIC: Application Specific Integrated Circuit. A dedicated (i.e., designed for a particular application) microprocessor/micro-controller.

CAS: Conditional Access System (or Software)

CHAP: Challenge Handshake Authentication Protocol, a type of authentication in which the authentication agent (typically a network server) sends the client program a random value that is used only once and an ID value. Both the sender and peer share a predefined secret. The peer concatenates the random value (or nonce, i.e., value used for the one or single occasion, the present call, or purpose), the ID and the secret and calculates a one-way hash (e.g., using SHA-1, MD5 or other hash algorithm). The hash value is sent to the authenticator, which in turn builds that same string on its side, calculates the SHA-1 sum itself and compares the result with the value received from the peer. When the values match, the peer is authenticated. By transmitting only the hash, the secret can not be reverse-engineered. The ID value is increased with each CHAP dialogue to protect against replay attacks.

Cryptographic key: Usually shortened to just "key". An input parameter (or value) that varies the transformation performed by a cryptographic algorithm. A sequence of symbols that controls the operations of encipherment and decipherment. When a key value is to be kept secret, the sequence of symbols (usually bits) that comprise the key should be random, or at least pseudo-random, because that makes the key more difficult for an adversary (e.g., hacker, thief, etc.) to determine.

DBS: Direct Broadcast Satellite (or System)

DES: Data Encryption Standard. A fixed-key-length security algorithm that employs 56-bit length keys. Any 56-bit number can be implemented as a DES key. The relatively short key length renders DES vulnerable to brute-force attack wherein all possible keys are tried one by one until the correct key is encountered (i.e., the key is "broken").

DRM: Digital Rights Management. A system for protecting the rights of data circulated via the Internet or other digital media (e.g., satellite transmissions, cable distributions, and the like) by performing at least one of enabling secure distribution and disabling illegal distribution of the data. Typically, a DRM system protects intellectual property by either encrypting the data so that it can only be accessed by authorized users or marking the content with a digital watermark or similar method so that the content can not be freely distributed.

Electronic Code Block (Mode): ECB, In ECB the message is divided into 64-bit blocks, and each block is encrypted separately. Encryption is independent for each block.

Entitlement Control Message (Stream): ECM, Messages that generally define access requirements of a program, specify the tiers required for subscription, and the cost associated with impulse purchase of the program. The index may be delivered in the ECM as a reference to the content key. Encrypted program keys may be delivered in the ECM stream.

Entitlement Management Message (Stream): EMM, Messages that define access rights for each individual decoder. The EMM stream is processed with the access control device; however, the user processor buffers EMMs and feeds the EMMs to the access control device via an interface.

Hash: A function (or process) that converts an input (e.g., the input stream) from a large domain into an output in a smaller set (i.e., a hash value, e.g., the output stream). Various hash processes differ in the domain of the respective input streams and the set of the respective output streams and in how patterns and similarities of input streams generate the respective output streams. One example of a hash generation algorithm is Secure Hashing Algorithm-1 (SHA-1). Another example of a hash generation algorithm is Message Digest 5 (MD5). The hash may be generated using any appropriate algorithm to meet the design criteria of a particular application.

Headend: The control center of a cable (or other) centralized media (e.g., television) system, where broadcast signals are received and distributed. The headend generally contains antennas, preamplifiers, frequency converters, demodulators, encoders, compressors, automatic switching equipment and other related equipment that receives, amplifies, filters, encrypts, encodes, and converts incoming satellite and terrestrial streams for presentation to distribution channels.

Initialization vector: IV, An initialization vector in a block cipher is a block of bits that is combined with the first block of data in any of several feedback r modes. The IV will make each cipher text unique, even when similar plain text is encrypted with the same key in chain block coding (CBC) mode.

Keylist: A list of decoder addresses and respective decoder keys in ordered pairs. Keylists may be used by the Uplink Control System (UCS) for generation of authorization messages that are addressed to the diagnostic circuit that is embedded in decoders that are specific to the encoder system.

Kernel: The central module of an operating system. It is the part of the operating system that loads first, and it remains in main memory. Because it stays in memory, it is important for the kernel to be as small as possible while still providing all the essential services required by other parts of the operating system and applications. Typically, the kernel is responsible for memory management, process and task management, and disk management.

Media: Plural of medium. The form and technology used to communicate information. Multimedia presentations, for example, combine sound, pictures, and videos, all of which are different types of media.

Middleware: Software that connects two otherwise separate applications. For example, there are a number of middleware products that link a database system to a Web server. The middleware allows users to request data from the database using forms displayed on a Web browser, and enables the Web server to return dynamic Web pages based on the user's requests and profile. The term middleware is used to describe separate products that serve as the glue between two applications. Middleware is, therefore, distinct from import and export features that may be built into one of the applications. Middleware is sometimes called plumbing because it connects two sides of an application and passes data between them.

MSO: Multiple System Operator

Nonce: A random value that is used only once. The nonce cryptographically binds a request and a response to prevent replay attacks. The nonce may be included as one of the requestExtensions in requests. While in responses the nonce may be included as one of the responseExtensions. In one example, in both the request and the response, the nonce will be identified by the object identifier id-pkix-ocsp-nonce, while the extnValue is the value of the nonce.

PID: Program Identification/Identifier

PKI: Public-key Infrastructure. A system of certification authorities (and, optionally, registration authorities and other supporting servers and agents) that perform some set of certificate management, archive management, key management, and token management functions for a community of users in an application of asymmetric cryptography. The core PKI functions are (a) to register users and devices and issue their public-key certificates, (b) to revoke certificates when required, and (c) to archive data needed to validate certificates at a much later time. Key pairs for data confidentiality may be generated (and perhaps escrowed) by certification authorities or registration authorities, but requiring a PKI client to generate its own digital signature key pair helps maintain system integrity of the cryptographic system, because then only the client ever possesses the private key it uses. Also, an authority may be established to approve or coordinate CPSs, which are security policies under which components of a PKI operate. A number of other servers and agents may support the core PKI, and PKI clients may obtain services from them. The full range of such services is not yet fully understood and is evolving, but supporting roles may include archive agent, certified delivery agent, confirmation agent, digital notary, directory, key escrow agent, key generation agent, naming agent who ensures that issuers and subjects have unique identifiers within the PKI, repository, ticket-granting agent, and time stamp agent.

Program: A time contiguous collection of motion image information, audio information, or a combination thereof that is transmitted (i.e., presented, broadcast, sent, delivered, etc.) as an entity.

Program Key: An encryption/decryption key that controls access, encryption/decryption, etc. of a particular program.

Smart card: A small electronic device about the size of a credit card that contains electronic memory, and possibly an embedded integrated circuit (IC). Smart cards containing an IC are sometimes called Integrated Circuit Cards (ICCs). Smart cards are used for a variety of purposes, including generating network IDs (similar to a token).

SSO: System Sign On

Token: In security systems, a small device the size of a credit card that displays a constantly changing ID code. A user first enters a password and then the card displays an ID that can be used to log into a network. Typically, the IDs change every 5 minutes or so. A similar mechanism for generating IDs is a Smartcard or, for cable installations, a Cablecard.

Triple-DES: (3-DES) Application of DES encryption three times using three different keys or, alternatively, using one key for the first and third segments of a three segment key and a second key for the middle segment, for a total key bit-width of 112 or 168 bits is also used to protect certain structures and the key inside entitlements.

Unit address: A unique number that identifies and distinguishes one decoder from another. One example of a unit address is a Media Access Control (MAC).

Unit key (or Private key): A key that is unique to a respective decoder. Messages intended for a particular decoder are encrypted using the respective unit key.

Unit keylist: A file that contains unit addresses and respective unit keys.

Uplink Control System (UCS): Software that is used to support the secure delivery of digitally compressed services. The UCS generally provides the capability to authorize and de-authorize individual decoders on an event-by-event basis.

URL: Uniform Resource Locator (World Wide Web address)

UTC: Universal Time Code

VOD: Video On Demand

Working key: A low level key that generally changes. The working key generally has a validity that is equal to or shorter in duration than the program to which it is related. The working key is also referred to as the "control word." In one typical example, the working key changes every 20 to 30 seconds. In one example (e.g., services that do not have a video component), the working key epoch (i.e., the period of time during a program for which a working key is valid) duration may be set at an appropriate time interval. However, any appropriate time for changing the working key may be implemented to meet the design criteria of a particular application. The working key is used to derive the keystream. The working key is generally delivered in an encrypted form with the respective program key.

Working Key File: A file that contains the working keys for the entire program that is encrypted in the program key, generally in chronological order.

The system and method for secure conditional access (CA) download and reconfiguration of the present invention generally provides a new, more secure, and yet simplified operation to deliver specialized keys and conditional access firmware in a very secure manner to a common (i.e., a system that is provided to a number of users) conditional access system software (CAS) hardware device. The new secure loading capability of the present invention provides significant renewabilty in a very secure manner and reduces the complexity and costs associated with renewing CA system software when compared to conventional approaches because a Smartcard does not need to be replaced.

The secure CA download and reconfiguration system and method of the present invention generally implements hardware related algorithms that can be changed securely and new key management structures and policies that can be securely loaded into a media stream hardware security device. The present invention generally provide far more efficient distribution and operations of content for CAS, Video On Demand (VOD) and Digital Rights Management (DRM) systems thereby lowering the switching costs and renewability costs should a counter measure (e.g., a response to an attack) be desired when compared to conventional approaches.

The secure CA download and reconfiguration of the present invention generally has flexibility and also helps to simplify the CAS and VOD security in the head-end. The simplified key management structure can generally be applied to the appropriate technologies and thereby standardize the overall approach to security for VOD.

The secure CA download and reconfiguration of the present invention generally provides the computer and consumer electronics (CE) industry implementation of new types of services for multiple system operators (MSOs). The secure CA download and reconfiguration of the present invention may be applicable to all CE and computer companies. The present invention may provide overall cost advantages for managing head-ends, set-top boxes and digital televisions. The present invention may lower the cost and ease the operational complexities for CAS and VOD applications, Digital Rights Management, and open new business models in interactive gaming, therefore providing substantial cost benefits to the MSOs when compared to conventional approaches.

By providing dramatically lower costs as well as increased innovation and new business models, the secure CA download and reconfiguration may improve the competitive position of cable service providers versus alternative video providers such as DBS and emerging telecommunications-based video systems. The present invention generally provides an improved system and method that may be compatible with previously used (i.e., legacy) systems and methods using all levels of media stream processing and delivery service (i.e., basic to high-end) as well as adaptable to future implementations, and that is flexible, renewable, and re-configurable. The present invention generally supports simultaneous multiple security systems and processes.

Figure 1:
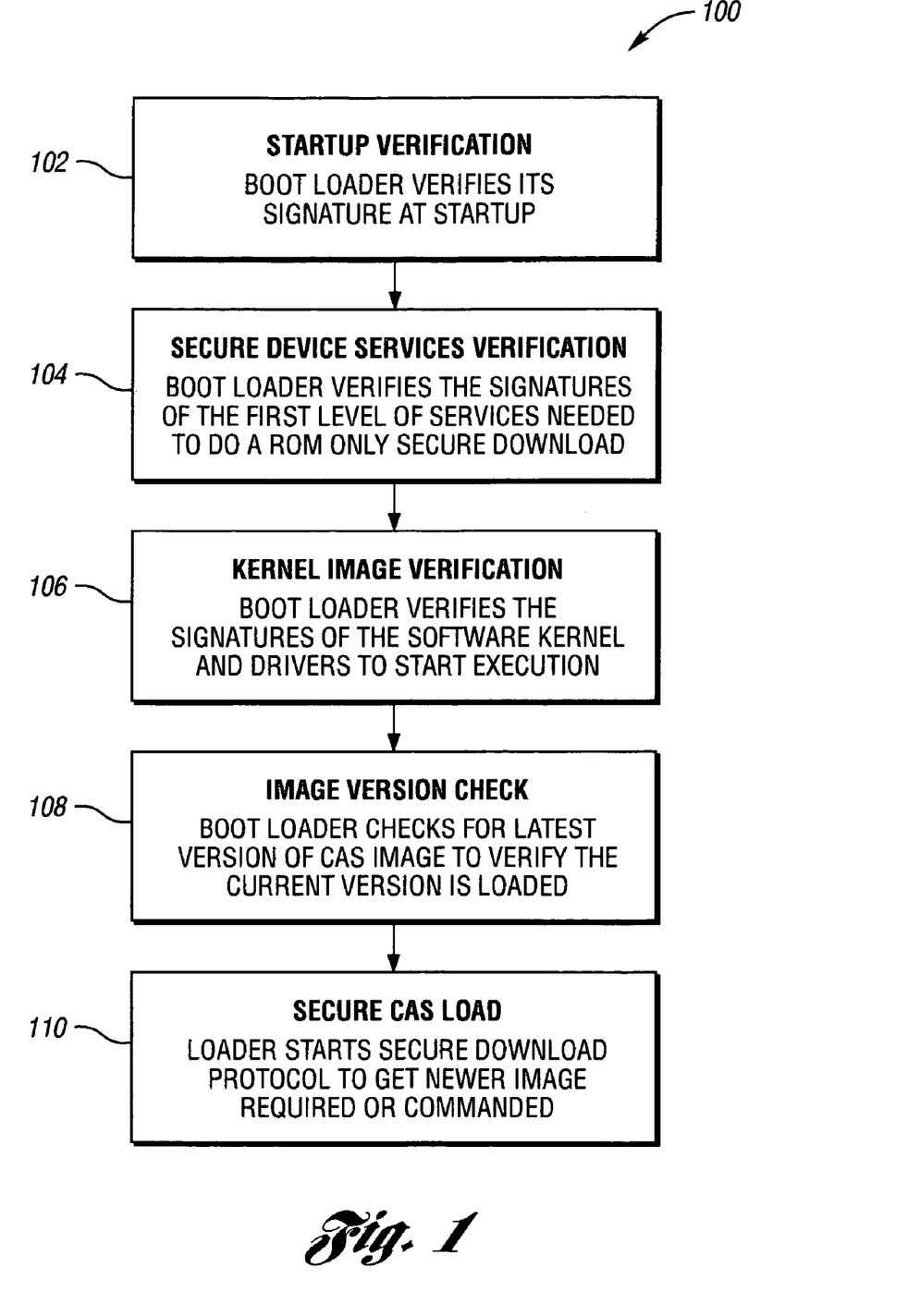
FIG. 1 is a diagram of a start check and verification process of the present invention.
Figure 2A:
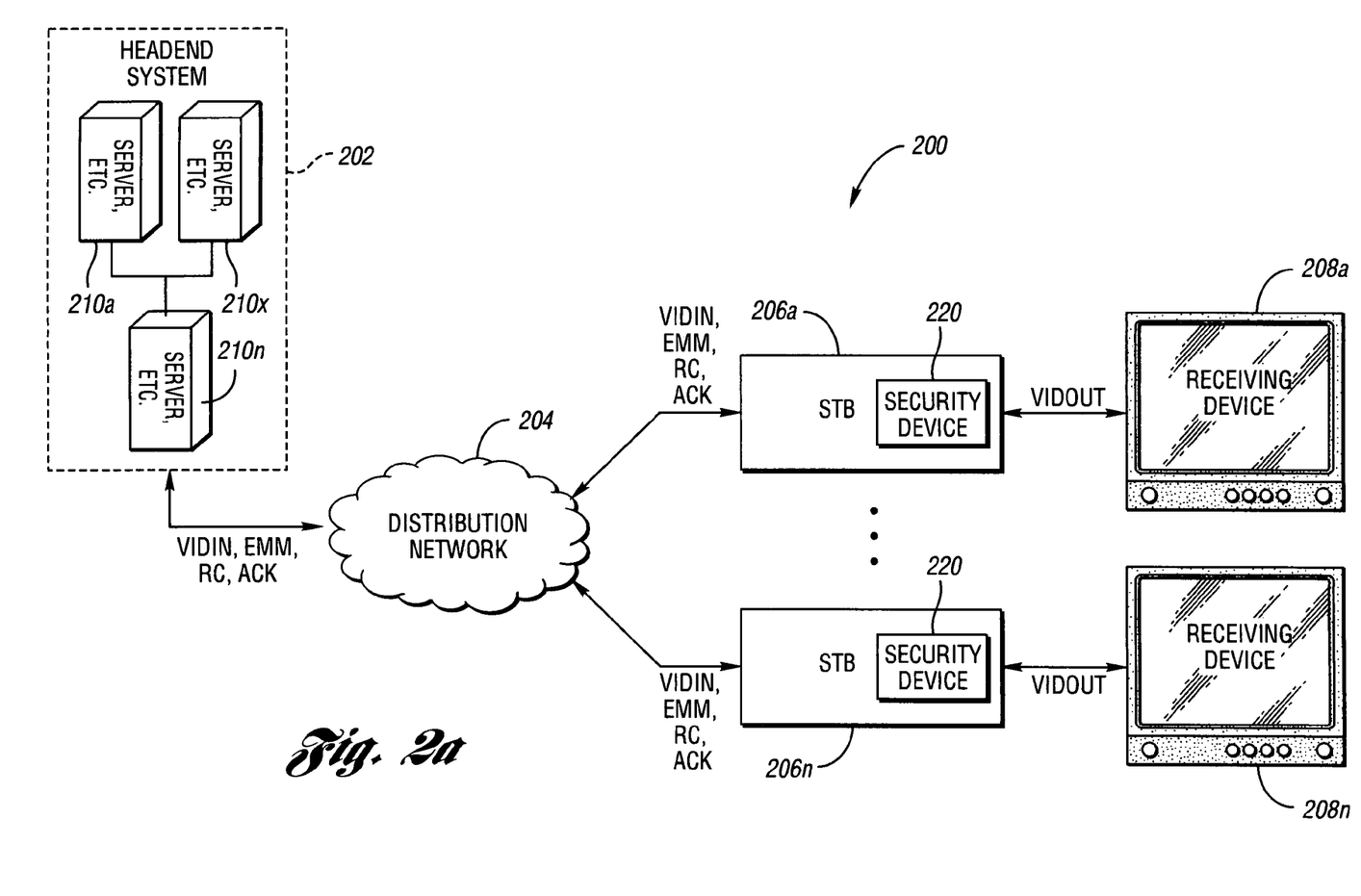
Figure 2B:
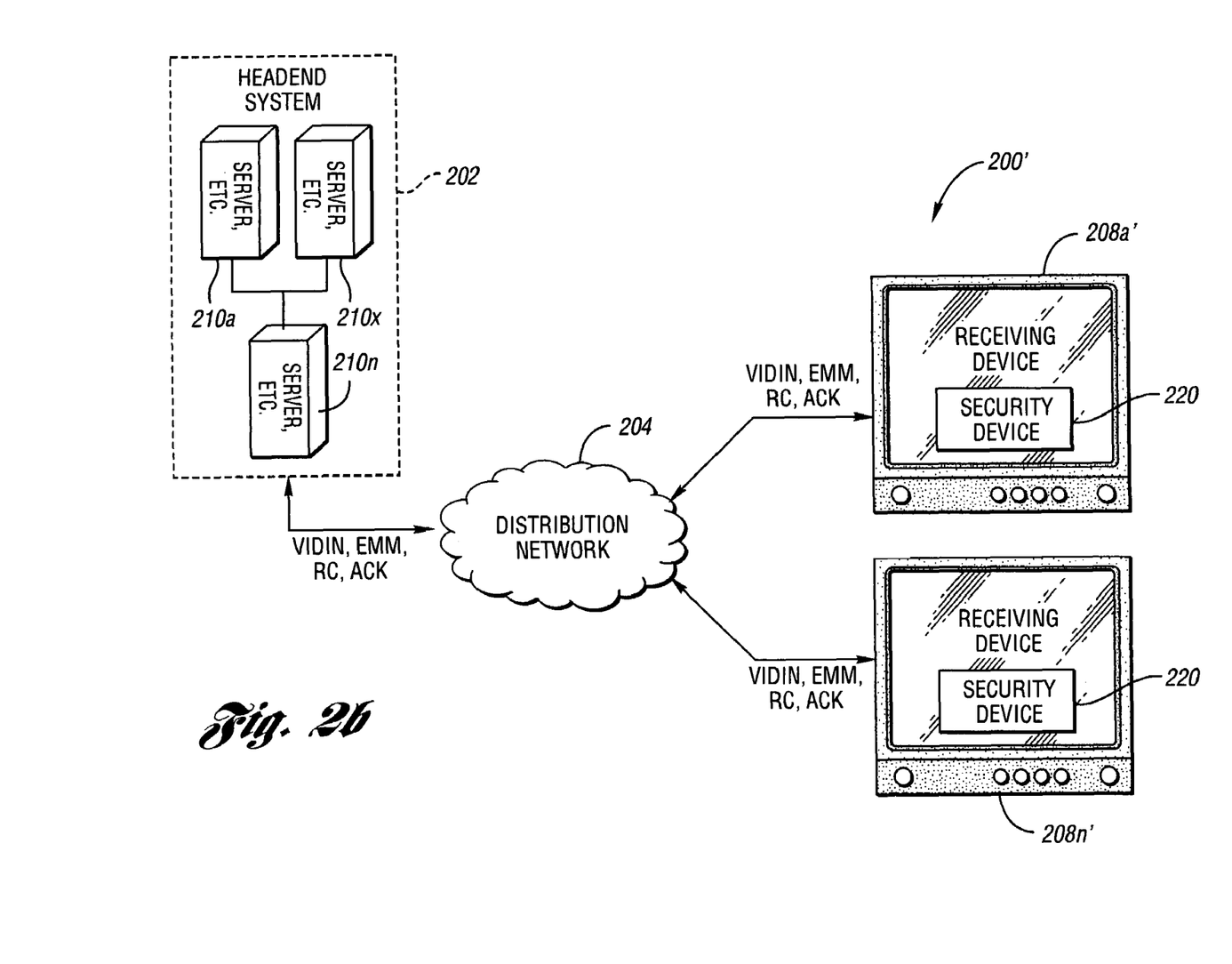

Referring to FIG. 1, a diagram illustrating a conditional access system software (CAS) startup check and verification procedure (i.e., method, operation, steps, blocks, routine, etc.) 100 of the present invention is shown. The method 100 is generally implemented in connection with a media stream processing and distribution system (described in more detail in connection with FIGS. 2(a-b)). The method 100 generally comprises a plurality of steps (e.g., steps 102, 104, 106, 108, and 110) that may be performed serially. However, the steps may be performed in at least one non-serial order, and steps may be omitted to meet the design criteria of a particular application.

When the startup verification procedure 100 is performed, a bootloader generally verifies a respective digital signature (e.g., the block or step 102, startup verification). The bootloader generally verifies respective signatures related to a first level of services that generally perform a secure download for at least one of a read only memory (ROM) and a securely protected Flash in a set top box (STB) or the like that is implemented in connection with the present invention (e.g., the block or step 104, secure device services verification). The bootloader generally verifies respective digital signatures related to a software kernel and drivers such that execution of the secure download of the present invention is initiated (e.g., the block or step 106, kernel image verification). The bootloader generally determines whether (verifies that) the CAS image loaded in the STB is the latest (i.e., most up-to-date, current, etc.) version (e.g., the block or step 108, images version check). The bootloader may initiate the secure download protocol of the present invention (described in more detail in connection with FIG. 3) when a more recent image version is desired or known to be available (e.g., the block or step 110, secure CAS load).

Referring to FIG. 2a, a diagram illustrating a media stream processing and distribution system 200 that may be implemented in connection with the present invention is shown. The distribution system 200 generally comprises a headend 202, a network 204, at least one set top box (STB) 206 (generally a plurality of STBs 206a-206n), and at least one respective receiving device (i.e., receiver, transceiver, etc.) 208 (generally a plurality of devices 208a-208n). The distribution system 200 is generally implemented as a media service provider/subscriber system wherein the provider (or vendor) generally operates the headend 202 and the network 204, and also provides a subscriber (i.e., client, customer, service purchaser, user, etc.) with the STB 206.

The STB 206 is generally located at the subscriber location (not shown, e.g., home, tavern, hotel room, business, etc.) and the receiving device 208 is generally provided by the client. The device 208 is generally implemented as a television, high definition television (HDTV), monitor, host viewing device, MP3 player, audio receiver, radio, personal computer, media player, digital video recorder, game playing device, etc. The device 208 may be implemented as a transceiver having interactive capability in connection with the STB 206, the headend 202 or both the STB 206 and the headend 202.

The headend 202 is generally electrically coupled to the network 204, the network 204 is generally electrically coupled to the STB 206, and each STB 206 is generally electrically coupled to the respective device 208. The electrical coupling may be implemented as any appropriate hard-wired (e.g., twisted pair, untwisted conductors, coaxial cable, fiber optic cable, hybrid fiber cable, etc.) or wireless (e.g., radio frequency, microwave, infrared, etc.) coupling and protocol (e.g., Home Plug, HomePNA, IEEE 802.11(a-b), Bluetooth, HomeRF, etc.) to meet the design criteria of a particular application. While the distribution system 200 is illustrated showing one STB 206 coupled to a respective one device 208, each STB 206 may be implemented having the capability of coupling more than one device 208 (not shown).

The headend 202 generally comprises a plurality of devices 210 (e.g., devices 210a-210n) that are implemented as data servers, computers, processors, security encryption and decryption apparatuses or systems, and the like configured to provide video and audio data (e.g., movies, music, television programming, games, and the like), processing equipment (e.g., provider operated subscriber account processing servers), television service transceivers (e.g., transceivers for standard broadcast television and radio, digital television, HDTV, audio, MP3, text messaging, gaming, etc.), and the like. In one example, the headend 202 may generate and present (i.e., transmit, provide, pass, broadcast, send, etc.) the stream VIDIN. At least one of the devices 210 (e.g., a sender security device 210x), may include a security system that implements the security processing 100 as described above in connection with FIG. 1, and further described in more detail in connection with FIGS. 3-5.

The device 210 that is implemented as a security system may receive clear or encrypted video and audio data and present clear or encrypted (and compressed or uncompressed) video and audio data (e.g., the stream VIDIN), may receive and present entitlement management messages (e.g., EMM), may receive and present random challenges (i.e., nonces, RC), and may receive and present acknowledgment signals (e.g., ACK). The signals EMM, RC and ACK, SLK (i.e., supervisory logon key) splits and other commands, requests, messages, signatures and the like may be transmitted and received in connection with the signals VIDIN. The entitlement management messages (e.g., the signals EMM) of the present invention may be specialized to include secure conditional access download and reconfiguration.

The network 204 is generally implemented as a media stream distribution network (e.g., cable, satellite, and the like) that is configured to selectively distribute (i.e., transmit and receive) media service provider streams (e.g., standard broadcast television and radio, digital television, HDTV, VOD, audio, MP3, text messaging, games, etc.) for example, to the STBs 206 and to the receivers 208, for example as the stream VIDIN. The stream VIDIN is generally distributed based upon (or in response to) subscriber information. For example, the level of service the client has purchased (e.g., basic service, premium movie channels, etc.), the type of service the client has requested (e.g., standard TV, HDTV, interactive messaging, etc.), and the like may determine the media streams that are sent to (and received from) a particular subscriber.

The STB 206 is generally implemented as an STB having multiple stream capability (e.g., standard broadcast television and radio, digital television, audio, MP3, high definition digital television (HDTV), text messaging, VOD, games such as interactive games, etc.). The STB 206 generally comprises at least one respective receiver security device (e.g., processor, apparatus, module, etc.) 220. The security processor 220 may be implemented as the STB security processor (or system) that is implemented in connection with the process 100. The receiver processor 220 may receive encrypted (and compressed) video and audio data (e.g., the stream VIDIN, the signals EMM, RC, ACK, and the like) and present clear video and audio data (e.g., a stream VIDOUT) to the receiver 208. The STB 206 may send an encrypted or a clear media stream (e.g., the stream VIDIN, the signals EMM, RC, ACK, and the like) to the headend 202 via the network 204.

Referring to FIG. 2b, a diagram illustrating a media stream processing and distribution system 200' implemented in connection with the present invention is shown. The distribution system 200' generally comprises the headend 202, the network 204, and at least one of the receiving device (i.e., receiver, transceiver, etc.) 208' (generally a plurality of the devices 208a'-208n'). The receiving device 208' is generally coupled directly to the network 204 and receives the signal or media stream VIDIN, the signals EMM, RC, ACK, and the like. In one example, the receiver security processor (or system) 220 may be implemented in connection with the device 208'. The device (e.g., transceiver) 208' may send an encrypted or a clear media stream (e.g., the stream VIDIN, the signals EMM, RC, ACK, and the like) to the headend 202 via the network 204. As such, the system and method 100 of the present invention may be implemented in any of the headend 202, the STB 206, and the receiving device 208', alone or in combination.

In yet another example (not shown), the system 200' may be implemented having at least one STB 206 coupled to the network 204 and with at least one receiver 208 coupled thereto, as well as having at least one device 208' that is directly coupled to the network 204.

Figure 3:
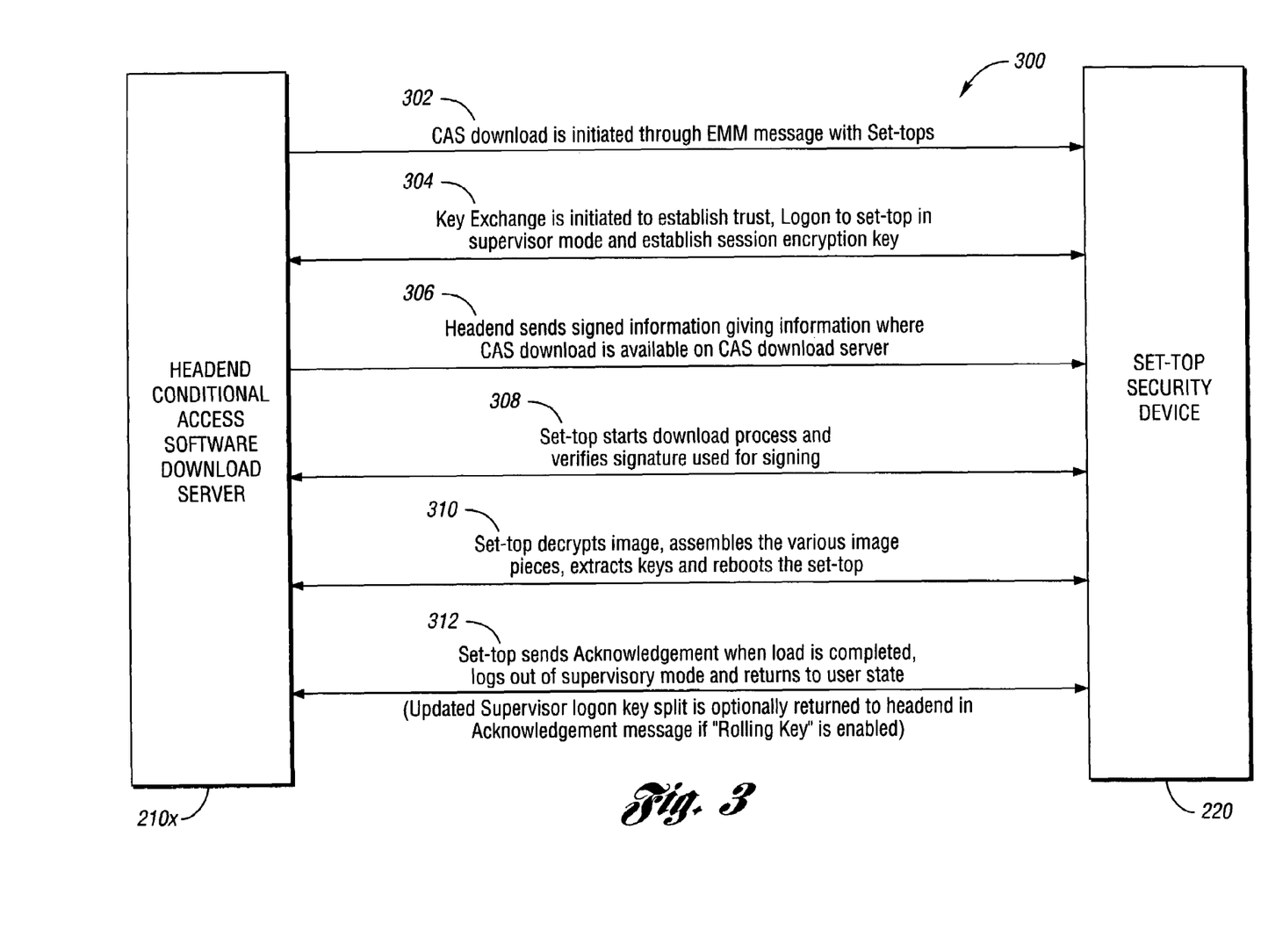
FIG. 3 is a diagram of a secure conditional access system download protocol of the present invention.

Referring to FIG. 3, a diagram illustrating a secure CAS download protocol for public key digital signatures (or public key cryptography procedure) 300 of the present invention is shown. The method 300 is generally performed in connection with the procedure 100 (e.g., the step 110). The method 300 is generally implemented in connection with a media stream processing and distribution system (e.g., the system 200 illustrated in FIGS. 2(a-b)). The method 300 generally includes exchange (i.e., communication) of messages (i.e., signals) to and from a server (e.g., the sender security server 210x) in the headend 202 and a STB security device or processor (e.g., the receiver processor 220) in a respective STB 206. The method 300 generally comprises a plurality of steps (e.g., steps 302, 304, 306, 308, 310 and 312) that may be performed serially. However, the steps may be performed in at least one non-serial order, and steps may be omitted to meet the design criteria of a particular application.

When the secure CAS receive download protocol is implemented (i.e., the procedure 300 is performed), an EMM message generally initiates the CAS receive download to the security device 220 in the STBs 206 (e.g., the block or step 302). A key exchange may be initiated to establish trust, to logon to the set top box (e.g., a STB 206) in a supervisor mode, and to establish a session encryption key (e.g., the block or step 304). A headend (e.g., the headend 202) may send (i.e., transmit, transport, broadcast, present, etc.) signed information that provides the location where the CAS download is available on the CAS download server (e.g., the server 210x at the block or step 306).

The STB 206 generally starts a download process, and verifies signatures and, in an optional or alternative example, a PKI chain may be used. for digital signing or random challenge/response (e.g., the block or step 308). The STB 206 generally decrypts an image, assembles the various image pieces (e.g., frames), extracts keys, and reboots the STB (e.g., the block or step 110). The STB 206 generally sends an acknowledgment message to the headend 202 when the load is completed, logs out of the supervisor mode, and returns to a user state. An updated supervisor SLK split is returned (optionally or alternatively, when a rolling key feature is enabled for additional security) to the headend 202 in the acknowledgment message (e.g., the block or step 312). The CAS download process is generally only implemented when the receiving security device (e.g., the processor 220) is in a supervisory mode of operation.

Figure 4:
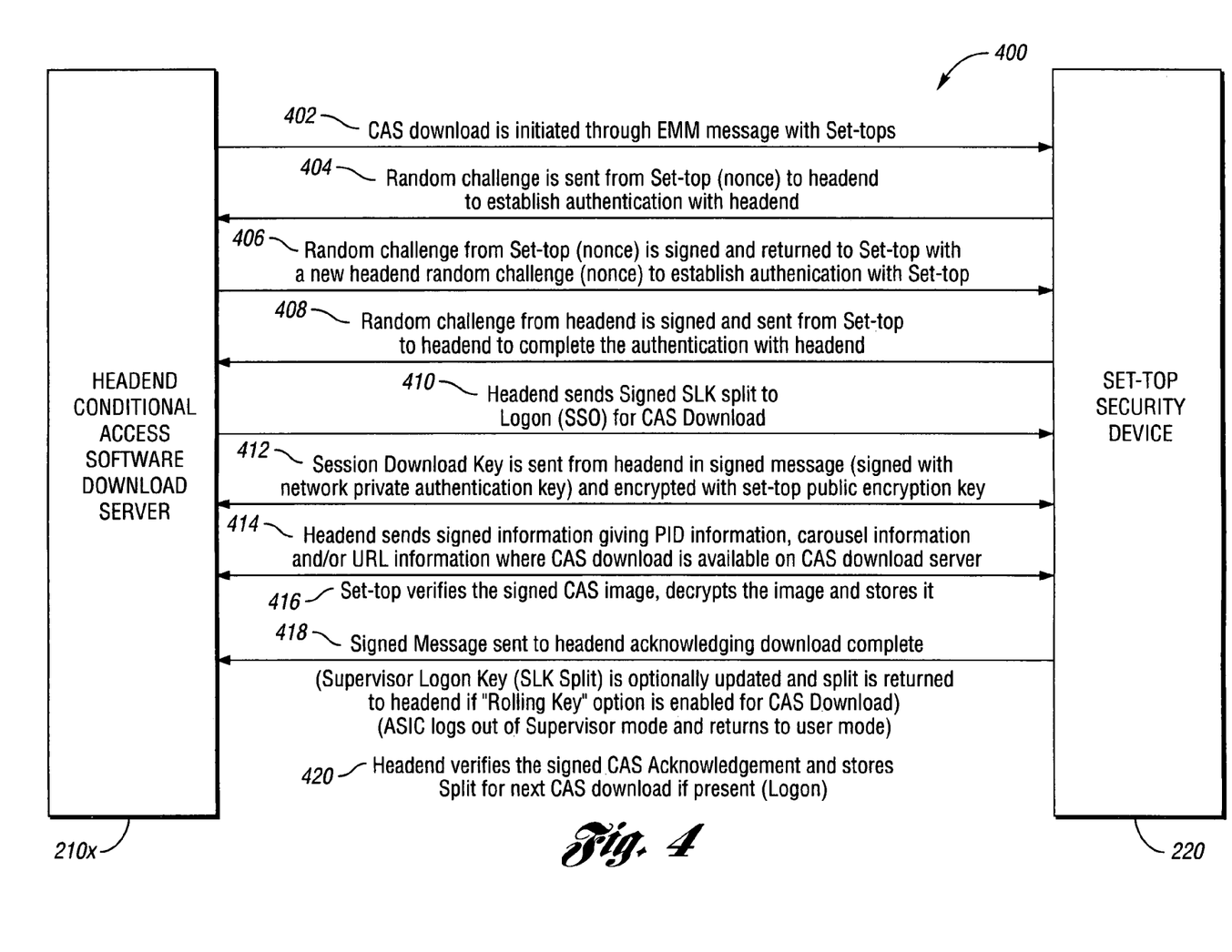
FIG. 4 is a diagram of secure conditional access system download processing of the present invention.

Referring to FIG. 4, a diagram illustrating a secure CAS download process 400 of the present invention is shown. The method 400 is generally performed in connection with the procedure 100 (e.g., the step 110). The method 400 is generally implemented in connection with a media stream processing and distribution system (e.g., the system 200 illustrated in FIGS. 2(a-b)). The method 400 generally includes exchange (i.e., communication) of messages (i.e., signals) to and from a server (e.g., the server 210x) in the headend 202 and a STB security device or processor (e.g., the processor 220) in a respective STB 206. The method 400 generally comprises a plurality of steps (e.g., steps 402, 404, 406, 408, 410, 412, 414, 416, 418, and 420) that may be performed serially. However, the steps may be performed in at least one non-serial order, and steps may be omitted to meet the design criteria of a particular application.

When the secure CAS download procedure 400 is performed, an EMM message generally initiates the CAS download to the security device 220 in the STBs 206 using a supervisory logon key (SLK) split to logon with another split contained inside an ASIC in the security device 220 (e.g., the block or step 402). A random challenge (i.e., a nonce, RCa) may be presented by the security device 220 to the headend security server 210x to establish authentication of the STB 206 to the headend 202 (e.g., the block or step 404). The random challenge (i.e., the nonce RC) is generally digitally signed and returned from the headend 202 to the STB 206 with a new random challenge (i.e., a new nonce, RCb) to establish authentication with the STB 206 (e.g., the block or step 406).

The new nonce (i.e., random challenge) RCb is generally digitally signed and presented by the STB 206 (i.e., by the security device 220) to the headend 202 (i.e., the server 210x) to complete the authentication with the headend 202 (e.g., the block or step 408). The headend 202 (i.e., the server 210x) generally presents a digitally signed SLK split to logon (i.e., a secure sign on, SSO) for performing the CAS download (e.g., the block or step 410). A session download key is generally sent from the headend 202 (i.e., the server 210x) in a digitally signed message (i.e., a message or signal that is generally signed with a network private authentication key) and encrypted with an encryption key to protect the session. The key encryption may be generated using security related equipment (e.g., the processor 220) according to well known cryptographic techniques (e.g., the block or step 412).

The headend 202 (i.e., the server 210x) generally presents signed information (i.e., a signed signal) that provides at least one of PID information, carousel information, and URL information that indicates where the respective CAS download is located and available on the CAS download server 210x (e.g., the block or step 414). The STB 206 generally decrypts the image using the respective session key, and verifies the digitally signed CAS image (e.g., the block or step 416).

A digitally signed message (e.g., ACK) is sent to the headend 202 (i.e., the server 210x) that acknowledges that the download is complete. When the alternative (or optional) rolling key is enabled, the SLK split is generally updated and returned to the headend 202. The ASIC that is implemented in the security device 220 logs out of the supervisor mode and returns to the user mode (e.g., the block or step 418). The CAS download process is only accessible in the supervisory mode by logon. As such, the receiving device can on longer accept a CAS download. The headend 202 (i.e., the server 210x) generally verifies the signed CAS acknowledgment ACK, and stores the split for use in a next (or subsequent) CAS download (i.e., logon) (e.g., the block or step 420).

The CAS download process does not generally occur (i.e., is not generally performed) unless the signed acknowledgment message ACK is verified and the decryption of the CAS image is successful. A following download of CAS software operation may not be performed unless a new SLK (and respective SLK split) is presented to unlock access to the following download operation. The CAS image is generally encrypted and decrypted using a key that comprises the SLK split in the sender security server (e.g., the server 210x) and the second split in the respective receiver security device.

Figure 5:
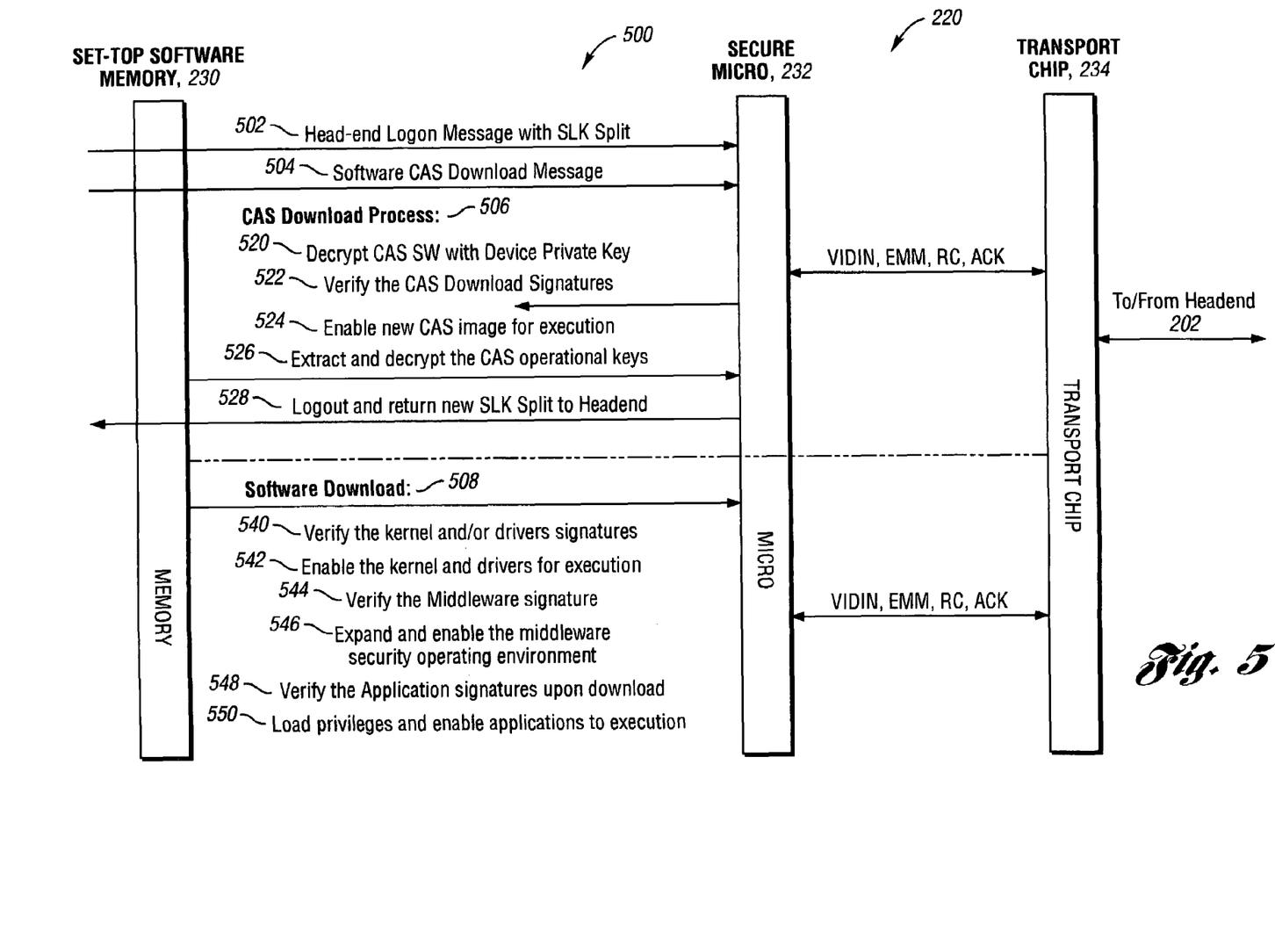
FIG. 5 is a diagram of secure download services of the present invention.

Referring to FIG. 5, a diagram illustrating the security device (or processor) 220 including secure download services 500 of the present invention is shown. The device 220 generally comprises a memory 230, a secure microprocessor 232, and a transport chip 234 that are electrically coupled to provide communication there between. In one example, the micro 232 may be implemented as an application specific integrated circuit (ASIC). However, the processor 232 may be implemented using any appropriate technology to meet the design criteria of a particular application.

At least one of the memory 230 and the microprocessor 232 generally contains (i.e., stores, holds, etc.) programming for the operation of the device 220 (e.g., middleware, a kernel, drivers, applications, privileges, etc.). The transport chip 234 generally comprises an interface for the STB 206 to the headend 202 via the network 204. That is, the signal or media stream VIDIN, the signals EMM, RC, ACK, and the like are generally transmitted to and from the security device 220 through the chip 234.

The secure download services 500 generally comprise a plurality of steps or blocks (e.g., steps 502, 504, 506, and 508) that may be performed serially. The block 506 generally further comprises steps or blocks 520, 522, 524, 526, and 528 that may be performed serially. The block 508 generally further comprises steps or blocks 540, 542, 544, 546, 548, and 550 that may be performed serially. However, the steps may be performed in at least one non-serial order, and steps may be omitted to meet the design criteria of a particular application.

The STB 206 generally presents a logon message with a SLK to the headend 202 (e.g., the step or block 502). The STB 206 generally presents a software CAS download message to the headend 202 (e.g., the step or block 504).

When the CA download process is initiated and performed (e.g., the step or block 502), the security micro 232 may decrypt the CAS software using the device 220 private key (e.g., the step or block 520). The micro 232 generally verifies the CAS download signatures (e.g., the step or block 522). A session download key is generally presented by the security server in a signal (e.g., VIDIN, EMM, RC, ACK and the like) and encrypted CAS receive download message. A new CAS image (e.g., VIDIN) is generally enabled for execution (e.g., the step or block 524). CAS operational keys may be extracted and decrypted (e.g., retrieved from the memory 230 and presented to the micro 232) (e.g., the step or block 526). A logout operation may be performed and optionally (i.e., alternatively, in another mode of operation, etc.) the new SLK split may be presented to the headend 202.

When the software download process is initiated and performed (e.g., the step or block 508), the secure micro 232 may verify signatures for at least one of the kernel and the drivers (e.g., the step or block 540). The kernel and the drivers are generally enabled for execution (e.g., the step or block 542). A signature that corresponds to (i.e., for, is related to, etc.) the middleware is generally verified (e.g., the step or block 544).

A security operating environment for the middleware is generally expanded and enabled (e.g., the step or block 546). The application signatures are generally verified upon download (e.g., the step or block 548). Privileges and applications are generally loaded to enable execution thereof (e.g., the step or block 550).

As is readily apparent from the foregoing description, then, the present invention generally provides an improved system and an improved method for secure conditional access (CA) download and reconfiguration. The present invention generally provides a new, more secure, and yet simplified operation to deliver specialized keys and conditional access firmware in a very secure manner to a common (i.e., a system that is provided to a number of users) conditional access system (CAS) hardware device.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of securely downloading at least one of conditional access software (CAS), Digital Rights Management software (DRMS), Trusted Domain Software (TDS), and Gaming Security Software (GSS), the method comprising:
   presenting a specialized entitlement management message (EMM) to initiate the download to a receiver security device using a supervisory logon key (SLK) split to logon with a second split contained inside the receiver security device;
   presenting a receiver digitally signed random challenge from the receiver security device to a sender security server to establish authentication of the receiver security device to the sender security server; and
   signing and returning the receiver random challenge from the sender security server to the receiver security device with a sender random challenge to establish authentication of the sender security server to the receiver security device.

2. The method of claim 1 further comprising signing and returning the sender random challenge from the receiver security device to the sender security server to complete authentication of the receiver security device to the sender security server.

3. The method of claim 2 further comprising sending a session download key from the sender security server in a signed and encrypted CAS receive download message.

4. The method of claim 3 further comprising sending signed information from the sender security server to the receiver security device that provides at least one of PID information, carousel information, and URL information that indicates where the respective encrypted CAS download is located and available on the sender security server.

5. The method of claim 4 further comprising decrypting a CAS image, and verifying the CAS image using a respective session key in the receiver security device.

6. The method of claim 5 further comprising sending a signed acknowledgment message to the sender security server when the CAS download is complete.

7. The method of claim 6 further comprising updating the SLK split in one mode of operation, and updating the SLK split and sending the updated SLK split to the sender security server when a rolling key feature is enabled in another mode of operation.

8. The method of claim 7 further comprising verifying the signed acknowledgment message in one mode of operation, and verifying the signed acknowledgment message and storing the updated SLK split for use in a next CAS download using the sender security server in another mode of operation.

9. The method of claim 8 further comprising logging the receiver security device out of a supervisor mode and returning to a user mode.

10. The method of claim 9 wherein the CAS download does not occur unless the signed acknowledgment message is verified, the head-end SLK successfully logs into a supervisor mode of operation, and the decryption of the CAS image is successful.

11. The method of claim 10 wherein a following download of CAS software operation is not performed unless a new SLK is presented to unlock access to the following download operation only when the receiver security device is in the supervisory mode of operation.

12. The method of claim 11 wherein the CAS image is encrypted and decrypted using a CAS image session key in the receiver security device.

13. A system for securely downloading at least one of conditional access software (CAS), Digital Rights Management software (DRMS), Trusted Domain Software (TDS), and Gaming Security Software (GSS), the system comprising:
   a headend having a sender security server; and
   a receiver coupled to the headend, and having a receiver security device, wherein
   the sender security server presents a specialized entitlement management message (EMM) to initiate the download to the receiver security device using a supervisory logon key (SLK) split to logon with a second split contained inside the receiver security device;
   the receiver security device presents a receiver digitally signed random challenge to the sender security server to establish authentication of the receiver security device to the sender security server; and
   the sender security server signs and returns the receiver random challenge to the receiver security device with a sender random challenge to establish authentication of the sender security server to the receiver security device.

14. The system of claim 13 wherein the receiver security device signs and returns the sender random challenge to the sender security server to complete authentication of the receiver security device to the sender security server.

15. The system of claim 14 wherein the sender security server sends a session download key in a signed and encrypted CAS receive download message.

16. The system of claim 15 wherein the sender security server sends signed information to the receiver security device that provides at least one of PID information, carousel information, and URL information that indicates where the respective CAS download is located and available on the sender security server.

17. The system of claim 16 wherein the receiver security device decrypts a CAS image, and verifies the CAS image using a respective session key.

18. The system of claim 17 wherein the receiver security device sends a signed acknowledgment message to the sender security server when the CAS download is complete.

19. The system of claim 18 wherein the receiver security device updates the SLK split in one mode of operation, and updates the SLK split and sends the updated SLK split to the sender security server when a rolling key feature is enabled in another mode of operation.

20. The system of claim 19 wherein the sender security server verifies the signed acknowledgment message in one mode of operation, and verifies the signed acknowledgment message and stores the updated SLK split for use in a next CAS download in another mode of operation.

21. The system of claim 20 wherein the receiver security device logs out of a supervisor mode and returns to a user mode, and thereby, disables access to downloading at least one of conditional access software (CAS), Digital Rights Management software (DRMS), Trusted Domain Software (TDS), and Gaming Security Software (GSS).

22. The system of claim 13 wherein the receiver security device is coupled to the headend using a network.

23. A receiver security device for securely downloading at least one of conditional access software (CAS), Digital Rights Management software (DRMS), Trusted Domain Software (TDS), and Gaming Security Software (GSS), the device comprising:

a microprocessor;

a transport chip coupled to the microprocessor; and a memory coupled to the microprocessor, wherein the memory includes programming to perform the steps of:

receiving a specialized entitlement management message (EMM) to initiate the download at the receiver security device using a supervisory logon key (SLK) split to logon with a second split contained inside the receiver security device from a sender security server via the transport chip;

presenting a receiver digitally signed random challenge from the receiver security device to the sender security server to establish authentication of the receiver security device to the sender security server; and receiving the signed receiver random challenge and a sender random challenge from the sender security server to establish authentication of the sender security server to the receiver security device.

* * * * *